US008956226B2

(12) United States Patent
Suzuki

(10) Patent No.: US 8,956,226 B2
(45) Date of Patent: Feb. 17, 2015

(54) GAME SYSTEM, SELECTION METHOD, AND INFORMATION RECORDING MEDIUM

(71) Applicant: Konami Digital Entertainment Co., Ltd., Minato-ku, Tokyo (JP)

(72) Inventor: Atsushi Suzuki, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 14/314,891

(22) Filed: Jun. 25, 2014

(65) Prior Publication Data

US 2014/0309031 A1 Oct. 16, 2014

Related U.S. Application Data

(63) Continuation-in-part of application No. PCT/JP2012/075255, filed on Sep. 28, 2012.

(30) Foreign Application Priority Data

Dec. 26, 2011 (JP) .................................. 2011-283288
Sep. 19, 2012 (JP) .................................. 2012-205707

(51) Int. Cl.
*A63F 13/213* (2014.01)
*A63F 13/20* (2014.01)

(52) U.S. Cl.
CPC ..................................... *A63F 13/06* (2013.01)
USPC .............................................. 463/31; 463/39

(58) Field of Classification Search
CPC ......... A63F 13/00; A63F 13/04; A63F 13/06;
A63F 13/12; A63F 13/219; A63F 13/23;
A63F 13/26; A63F 13/42; A63F 2300/204;
A63F 2300/301
USPC .............................. 463/31, 34, 36, 37, 39, 40
See application file for complete search history.

(56) References Cited

U.S. PATENT DOCUMENTS 6,572,476 B2 * 6/2003 Shoji et al. ...................... 463/33
6,921,336 B1 * 7/2005 Best ................................. 463/32

(Continued)

FOREIGN PATENT DOCUMENTS

JP 2001-34247 A 2/2001
JP 2007-260347 A 10/2007

(Continued)

OTHER PUBLICATIONS

"Futari wa Precure Splash*star, Panpaka*Geme de Zekkocho! particularly, refer to image and record concerning 'Kingyo Sukui' at the lower central part", Famitsu DS+Wii, Jan. 1, 2007, p. 52, vol. 9, No. 1.

*Primary Examiner* — Damon Pierce
*Assistant Examiner* — Allen Chan
(74) *Attorney, Agent, or Firm* — Sughrue Mion, PLLC

(57) ABSTRACT

A target region detector detects a target region in a display of a first device. A communicator receives positional information of an object, transmitted from the first device. An image generator generates an image including an object, in the detected target region, of the received positional information, and displays the image on an image display. In response to a predetermined selection operation on an object displayed on the image display, the controller generates selection information of the object, and then transmits the selection information to the first device via the communicator.

5 Claims, 17 Drawing Sheets

(56) References Cited

U.S. PATENT DOCUMENTS

2003/0216177 A1* 11/2003 Aonuma et al. ............ 463/32
2009/0143138 A1* 6/2009 Miyamoto et al. ......... 463/31

FOREIGN PATENT DOCUMENTS

| JP | 2012-64199 A | 3/2012 |
| WO | 2011/096203 A1 | 8/2011 |

* cited by examiner

Fig. 6

| OBJECT ID | CURRENT POSITION | DIRECTION | LEVEL OF DIFFICULTY | MOVE STATE | CATCH STATE | ... |
|---|---|---|---|---|---|---|
| OB-001 | (x1, y2, z3) | (x2, -y3, z4) | 3 | SMALL | UNCAUGHT | ... |
| OB-002 | (x4, y5, z6) | (-x5, y6, z7) | 4 | LARGE | UNCAUGHT | ... |
| OB-003 | — | — | 1 | — | CAUGHT | ... |
| OB-004 | (x7, y8, z9) | (x9, -y8, z9) | 2 | STOP | UNCAUGHT | ... |
| ... | ... | ... | ... | ... | ... | |

GAME SYSTEM, SELECTION METHOD, AND INFORMATION RECORDING MEDIUM

CROSS-REFERENCE TO RELATED APPLICATION

This application is a continuation of International Application No. PCT/JP2012/075255, filed Sep. 28, 2012. Note that this application claims the benefit of priority from Japanese Patent Application No. 2011-283288 and Japanese Patent Application No. 2012-205707, and the entire contents of the basic applications are incorporated herein.

TECHNICAL FIELD

The present invention relates to a game system, a selection method, and a non-transitory information recording medium that enable a player to easily perform a selection operation on an object displayed on a remote screen on a screen at hand.

BACKGROUND ART

Recently, a game device with a characteristic controller has been introduced to the market and attracted popularity. One example is a controller that enables a player to perform an intuitive operation while holding the controller with one hand. Such a controller is wirelessly connected to a game device (main unit) and is capable of detecting a motion performed by moving the controller itself as well as a key operation (a button operation) performed by a player on the controller. For example, a player can play a shooting and the like by pointing a tip of a controller at a screen (a television or the like), aiming at a desired object (a target or the like) displayed on the screen, and then pressing a trigger button.

An invention of game device with such a controller has been disclosed that is capable of appropriately correcting a sighting position specified by the controller on a screen (refer to Patent Literature 1, for example).

CITATION LIST

Patent Literature

Patent Literature 1: Unexamined Japanese Patent Application Laid-Open Publication No. 2007-260347 (pp. 7-14, FIG. 2)

SUMMARY OF INVENTION

Technical Problem

To play a game using such a controller, a player needs to keep a certain distance from a screen. Because of this, some players feel difficult to see an object displayed on the remote screen in some cases. Moreover, in a game that requires fine operations and the like, many players feel difficult to operate an object displayed on a remote screen.

Because of such a situation, a technique for enabling to easily operate an object displayed on a remote screen has been demanded.

Solution to Problem

A game system according to a first aspect of the present disclosure is a game system in which a first device and a second device are communicable, the first device being capable of displaying an image on a first screen, the second device being operated by a player and capable of displaying an image on a second screen. The first device is configured by including a display controller, a receiver, and an executor, and the second device is configured by including a detector, a display controller, and a transmitter.

A game system according to a second aspect of the present disclosure is a game system in which a first device and a second device are communicable, the first device being capable of displaying an image on a first screen, the second device being operated by a player and including a second screen, which is smaller than the first screen. The first device is configured by including an object manager, a transmitter, a display controller, a receiver, and an executor, and the second device is configured by including a detector, a receiver, a display controller, and a transmitter.

A selection method according to a third aspect of the present disclosure is a selection method for a game system in which a first device and a second device are communicable, the first device being capable of displaying an image on a first screen, the second device being operated by a player and capable of displaying an image on a second screen. The selection method is configured by including an image control step, a detection step, a display control step, a transmission step, a reception step, and an execution step.

A non-transitory information recording medium according to a fourth aspect of the present disclosure stores a program for causing a computer (including electronic equipment) to function as the above-described game device.

BRIEF DESCRIPTION OF DRAWINGS

FIG. 4 is an external view illustrating an arrangement of the stationary game console and the portable game console, and the like;

FIG. 6 is a schematic view illustrating an example of a management table for managing objects;

DESCRIPTION OF EMBODIMENTS

Figure 1:
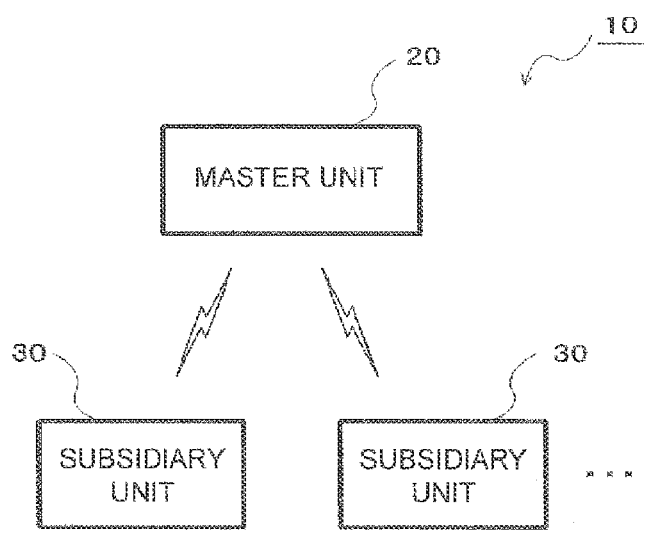
FIG. 1 is a block diagram showing an overview of a game system according to this embodiment.

FIG. 1 is a block diagram showing a schematic configuration of a game system 10 according to an embodiment of the present disclosure. In the following, description will be given with reference to FIG. 1. As shown in FIG. 1, in the game system 10, a master unit 20 and a plurality of subsidiary units 30 form a wireless communication network. The master unit 20 and the individual subsidiary unit 30 are arranged nearby respectively, for example, in a living room of a house or the like. Note that the number of the subsidiary units 30 may be one. The master unit 20 is, for example, a device capable of displaying an image on a large screen (a relatively large screen with high resolution and the like) and carries out a game by exchanging predetermined information with the individual subsidiary unit 30. By contrast, the subsidiary unit 30 includes a small screen (a relatively small screen with low resolution and the like) having a smaller area than that of the screen of the above master unit 20. The subsidiary unit 30 is held and thereby operated by a player joining in a game.

To facilitate understanding of the present disclosure, in the following, description will be given by taking a case of using a stationary game console as an example of the master unit 20 while using a portable game console as an example of the subsidiary unit 30. Alternatively, a portable game console may be used as the master unit 20, and a stationary game console may be used as the subsidiary unit 30. Moreover, when a plurality of portable game consoles are only used, one of the portable game consoles may be used as the master unit 20 while the others are used as the subsidiary units 30. In other words, the master unit 20 and the subsidiary unit 30 are not to be distinguished in terms of performance or functions as game consoles but are called differently only for convenience of describing the present disclosure. Hence, hereinafter, the master unit 20 and the subsidiary unit 30 will be described simply as a first device and a second device, respectively. In addition, the present disclosure is also applicable to a case of using an information processor such as a computer of various types, a PDA, a mobile phone, and a smartphone, in addition to the above game consoles (such as a stationary game console and a portable game console). In other words, embodiments to be described below are provided for illustration purposes and not to limit the scope of the invention of this application. Hence, employing embodiments with equivalents replacing some of or all of the above components is possible for those skilled in the art, and such embodiments are also within the scope of the present disclosure.

(Overview of Stationary Game Console)

Figure 2:
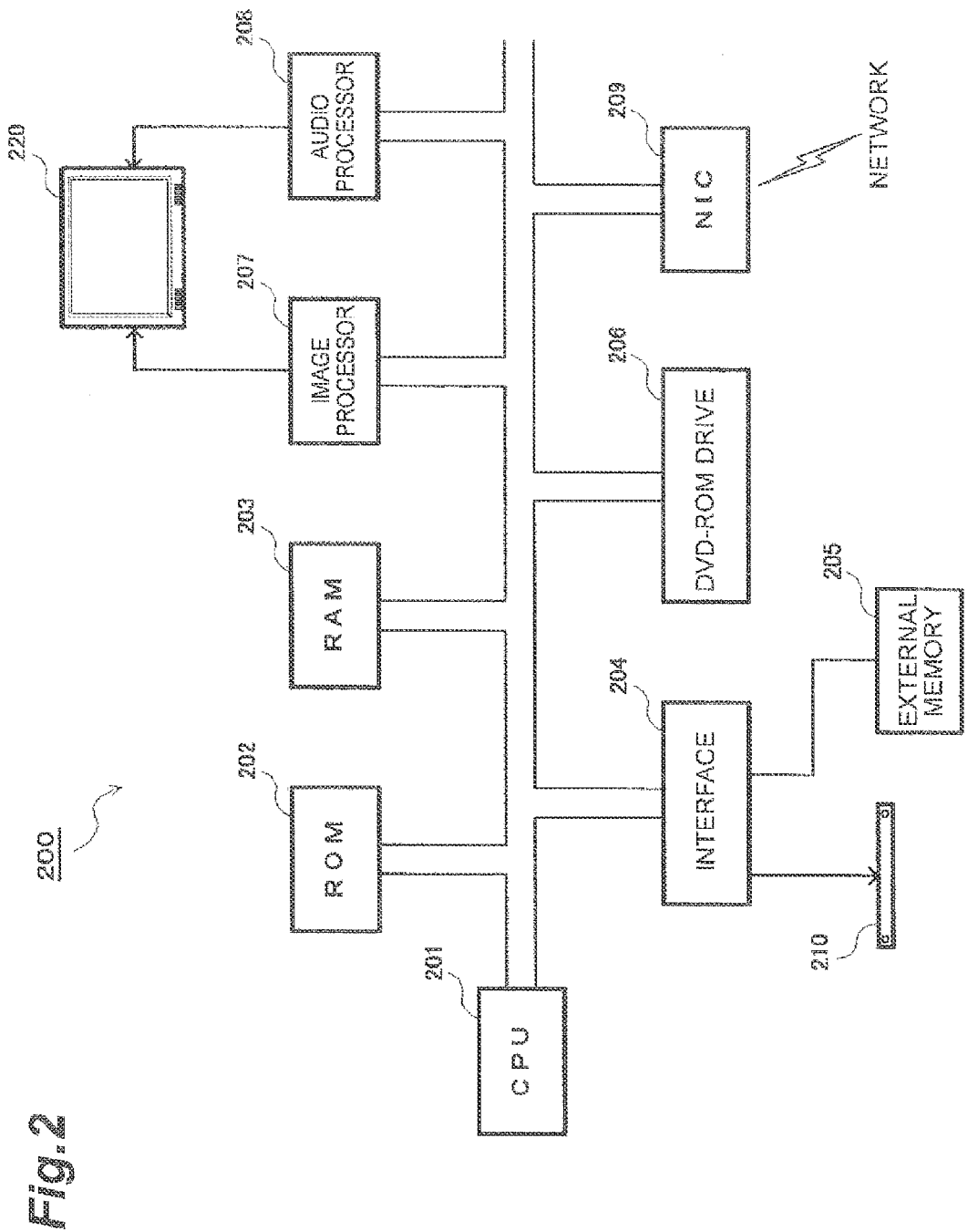
FIG. 2 is a block diagram illustrating a schematic configuration of a stationary game console to serve as a first device of this embodiment.

FIG. 2 is a block diagram showing a schematic configuration of a stationary game console 200 to be used as the first device. In the following, description will be given with reference to FIG. 2. The stationary game console 200 comprises a CPU (Central Processing Unit) 201, a ROM (Read Only Memory) 202, a RAM (Random Access Memory) 203, an interface 204, an external memory 205, a DVD (Digital Versatile Disc)-ROM drive 206, an image processor 207, an audio processor 208, and a NIC (Network Interface Card) 209. Moreover, a light-emitting module 210 and a display 220 are connected to the stationary game console 200 via predetermined cables.

The first device according to this embodiment is implemented by loading a DVD-ROM storing a game program and data into the DVD-ROM drive 206, turning on the power of the stationary game console 200, and thereby executing the program.

The CPU 201 controls operations of the entire stationary game console 200. The CPU 201 is connected to each component of the stationary game console 200 and exchanges control signals and data with the component.

In the ROM 202, an IPL (Initial Program Loader) to be executed immediately after the power is turned on is recorded. When the IPL is executed, the program recorded in the DVD-ROM is loaded into the RAM 203, and the CPU 201 starts to execute the program. In addition, an operating system program and various data required for operation control for the entire stationary game console 200 are recorded in the ROM 202.

The RAM 203 temporarily stores data and programs and holds programs and data loaded from the DVD-ROM and additionally data required for game progress and chat communication.

The light-emitting module 210 connected via the interface 204 includes a plurality of light-emitting elements, and causes the light-emitting elements to emit light as appropriate during a game. The light-emitting module 210 will be described later in detail.

In the external memory 205 detachably connected via the interface 204, data indicating a progress state of the game, data on a log (record) of the game result, and the like, are stored in a rewritable manner.

In the DVD-ROM loaded into the DVD-ROM drive 206, a program for implementing the game as well as image data and audio data for the game are recorded. In response to control by the CPU 201, the DVD-ROM drive 206 performs a reading process for the DVD-ROM loaded thereinto and thereby reads out necessary programs and data, which are then temporarily stored in the RAM 203 or the like.

The image processor 207 performs processing on the data read out from the DVD-ROM, by an image arithmetic processor (not shown in the drawings) included in the CPU 201 or the image processor 207, and then records the data in a frame memory (not shown in the drawings) included in the image processor 207. Image information recorded in the frame memory is converted to a video signal (video signal) at predetermined synchronous timing and is then provided to the display 220. In this way, various images can be displayed.

Note that the image arithmetic processor is capable of performing high-speed execution of an operation for two-dimensional image registration, a transmittance operation such as a blending, and various saturation operations. Moreover, the image arithmetic processor is further capable of high-speed execution of an operation for rendering polygon information that is arranged in virtual three-dimensional space and to which various kinds of texture information are added, by z-buffering and thereby obtaining a rendered image looking down upon polygons arranged in the virtual three-dimensional space from a predetermined viewpoint position.

Furthermore, the CPU 201 and the image arithmetic processor enable, by operating in cooperation with each other, drawing of a character string on a frame memory or on a surface of each polygon, as a two-dimensional image, according to font information defining character shapes. The font information is recorded in the ROM 202, but specifically private font information recorded in the DVD-ROM may also be used.

The display 220 is configured by a liquid crystal television or the like, for example, and displays, upon receipt of a video signal generated by the image processor 207, an image according to the video signal on a screen. Note that the display 220 includes, for example, a large screen (a relatively large screen with high resolution and the like), which is capable of displaying a relatively large image (wide-range image). Moreover, the display 220 also includes a speaker (a stereo speaker or the like), and is capable of outputting, upon receipt of an audio signal, voice, music, or the like according to the audio signal.

The audio processor 208 converts voice data or the like, read out from the DVD-ROM, to an audio signal and then provides the audio signal to the display 220. For example, under control by the CPU 201, the audio processor 208 generates sound effect or music data to be produced during a game, converts the data to an audio signal, and then provides the audio signal to the display 220. In this way, various voice outputs can be produced from a speaker of the display 220.

The NIC 209 is provided to connect the stationary game console 200 to a predetermined network, and is capable of connecting to the Internet or the like via an access point or a router located nearby, in accordance with wireless LAN (Local Area Network) standard, for example. Moreover, as will be described later, the NIC 209 is also capable of forming a network by being wirelessly connected to a portable game console and the like located nearby.

Alternatively, the stationary game console 200 may be configured to use a large-capacity external storage such as a hard disk, to provide the same functions as the ROM 202, the RAM 203, the external memory 205, the DVD-ROM loaded in the DVD-ROM drive 206, and the like. In addition, the stationary game console 200 can also employ a configuration for connecting a controller for receiving an operation instruction from a player, a keyboard for receiving input for editing character strings, a mouse for receiving input for specifying and selecting various positions, and the like.

Further, instead of the stationary game console 200, a general computer (a general-purpose personal computer or the like) can be used as the first device. For example, as in the case of the above-described stationary game console 200, such a general computer includes a CPU, a RAM, a ROM, a DVD-ROM drive, a NIC, and the like, includes an image processor having a simpler function than that of the stationary game console 200 and also includes a hard disk as an external storage while being capable of using a flexible disk, a magneto-optical disk, a magnetic tape, and the like. Moreover, a light-emitting module can also be connected to such a general computer via a general-purpose interface. Such a general computer functions as the first device by installing a game program and then executing the program.

(Overview of Portable Game Console)

Figure 3:
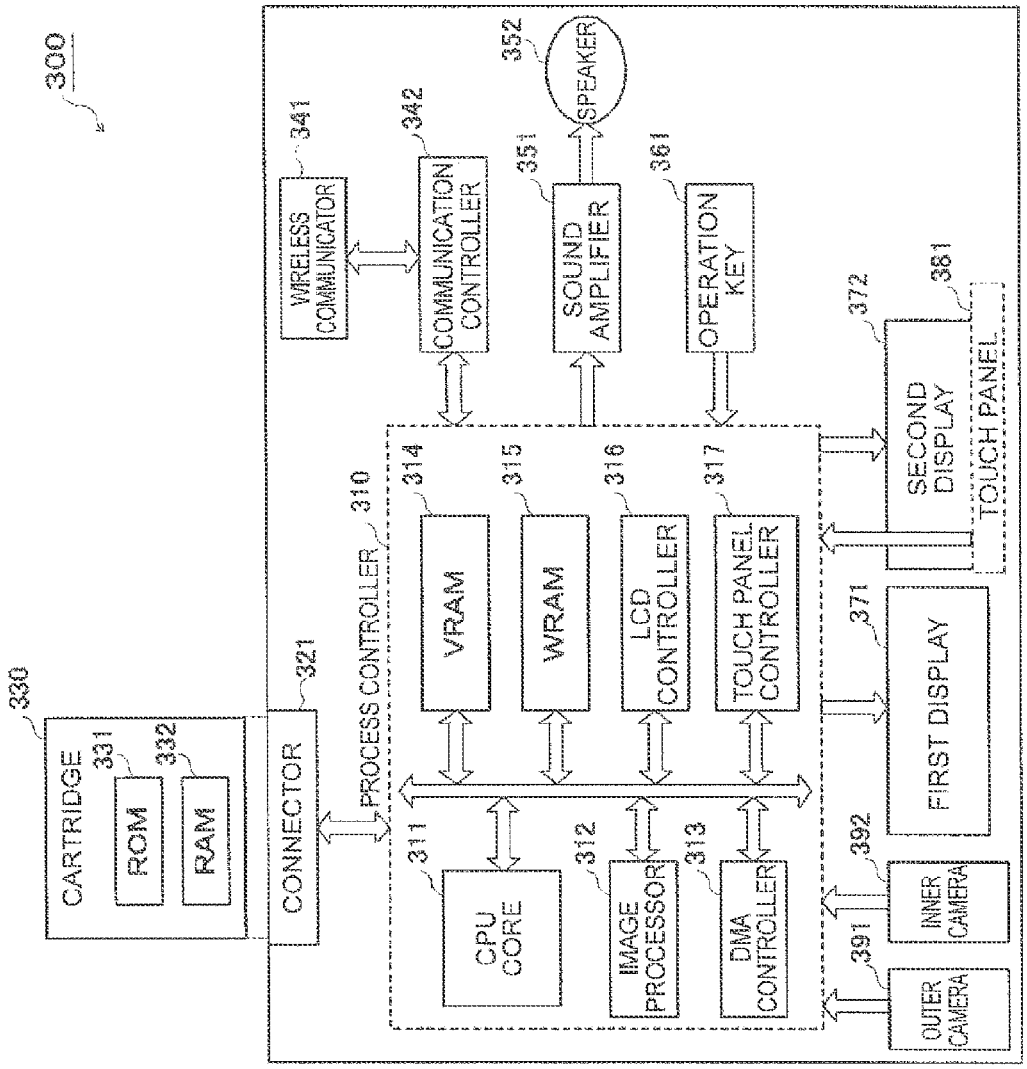
FIG. 3 is a block diagram illustrating a schematic configuration of a portable game console to serve as a second device of this embodiment.

FIG. 3 is a block diagram showing a schematic configuration of a portable game console 300 used as the second device. In the following, description will be given with reference to FIG. 3. The portable game console 300 comprises a process controller 310, a connector 321, a cartridge 330, a wireless communicator 341, a communication controller 342, a sound amplifier 351, a speaker 352, an operation key 361, a first display 371, a second display 372, a touch panel 381, an outer camera 391, and an inner camera 392.

Note that the second device according to this embodiment is implemented by mounting the cartridge 330 storing a game program and data on the connector 321, turning on the power of the portable game console 300, and thereby executing the program.

The process controller 310 comprises a CPU core 311, an image processor 312, a DMA (Direct Memory Access) controller 313, a VRAM (Video RAM) 314, a WRAM (Work RAM) 315, an LCD (Liquid Crystal Display) controller 316, and a touch panel controller 317.

The CPU core 311 controls operations of the entire portable game console 300. The CPU core 311 is connected to each component and exchanges control signals and data with the component. Specifically, in a state where the cartridge 330 is mounted on the connector 321, the program and data stored in a ROM 331 in the cartridge 330 are read out, and thereby a predetermined process is executed.

The image processor 312 performs processing on data read out from the ROM 331 in the cartridge 330 or data processed by the CPU core 311, and then stores the data in the VRAM 314. For example, the image processor 312 processes an image stored in the WRAM 315 and then stores the image in the VRAM 314.

The DMA controller 313 transfers images captured by the outer camera 391 and the inner camera 392 to the WRAM 315 and the like.

The VRAM 314 is a memory storing information for display, and stores image information processed by the image processor 312 or the like. The WRAM 315 stores work data and the like required when the CPU core 311 performs various processes according to the program. Moreover, the WRAM 315 temporarily stores images transferred by the DMA controller 313.

The LCD controller 316 controls the first display 371 and the second display 372 to cause each display to display a predetermined display image. For example, the LCD controller 316 converts image information, which is stored in the VRAM 314, to a display signal at predetermined synchronous timing, and then outputs the display signal to the first display 371. Similarly, the LCD controller 316 causes the second display 372 to display the predetermined display image.

When the touch panel 381 is pressed down (pressed) by a touch pen or a finger of a player, the touch panel controller 317 acquires coordinates (input coordinates) of the pressed point.

The connector 321 is a terminal detachably connectable to the cartridge 330. When the cartridge 330 is connected (inserted), the connector 321 transmits and receives predetermined data to and from the cartridge 330.

The cartridge 330 comprises a ROM 331 and a RAM 332. In the ROM 331, the program for implementing the game as well as image data, voice data, and the like for the game are recorded. In the RAM 332, various data indicating a progress state of the game and the like are stored.

The wireless communicator 341 is a unit for performing wireless communication with the above-described stationary game console 200 and other portable game consoles 300, and transmits and receives predetermined data via an unillustrated antenna (a built-in antenna or the like). Note that the wireless communicator 341 can be connected to the Internet or the like via an access point or a router located nearby, for example.

The communication controller 342 controls the wireless communicator 341 and relays the wireless communication with the stationary game console 200 or the other portable game consoles 300, in accordance with a predetermined protocol. Moreover, when connecting to the Internet via an access point, a router, or the like located nearby, the communication controller 342 relays wireless communication with the access point or the like, in accordance with a protocol conforming to the wireless LAN.

The sound amplifier 351 amplifies a voice signal generated by the process controller 310 and then provides the signal to the speaker 352. The speaker 352 is configured by a stereo speaker or the like, for example, and outputs predetermined music, sound effect, and the like, according to the voice signal amplified by the sound amplifier 351.

The operation key 361 includes a plurality of keys, buttons, and the like arranged on the portable game console 300 as appropriate, and receives a predetermined instruction input in response to an operation by a user. For example, the operation key 361 includes a cross key, an A-button, and the like to be described later, and when being pressed by a player, the operation key 361 provides an operation signal corresponding to the keys or the like to the process controller 310.

The first display 371 and the second display 372 are configured by LCDs or the like, and are controlled by the LCD controller 316 to display a game image and the like as appropriate.

The touch panel (touch screen) 381 is overlaid on the second display 372 as will be described later and detects input by a touch pen or a finger of a player. For example, the touch panel 381 is configured by a resistive touch sensor panel or the like, detects pressing (pressing down) by the touch pen or the like, and then outputs information (a signal or the like) corresponding to the coordinates.

The outer camera 391 is integrated in the outer side of the portable game console 300 (the back of the first display 371) as will be described later and captures an image in a direction in which the back of the first display 371 is facing. By contrast, the inner camera 392 is integrated in the inner side of the portable game console 300 (below the first display 371) as will be described later and captures an image in a direction in which the front of the first display 371 is facing. Each of the outer camera 391 and the inner camera 392 is configured by including a single-vision lens and imaging devices (CMOSs, CCDs, or the like) with a predetermined number of pixels, as an example, and captures an image with each optical axis in the center at a predetermined focal length (a predetermined angle of view). On a front surface of the outer camera 391, a detachable infrared filter is provided, for example. The infrared filter is a filter for allowing infrared rays in a predetermined wavelength range to pass through, as an example, and is capable of allowing beams from infrared-emitting elements of the light-emitting module 210 to be described later, to pass through. Moreover, a plurality of outer cameras 391 and a plurality of inner cameras 392 may be provided respectively so that a three-dimensional image can be captured.

(Arrangement and the Like of Stationary Game Console and Portable Game Console)

Figure 4:
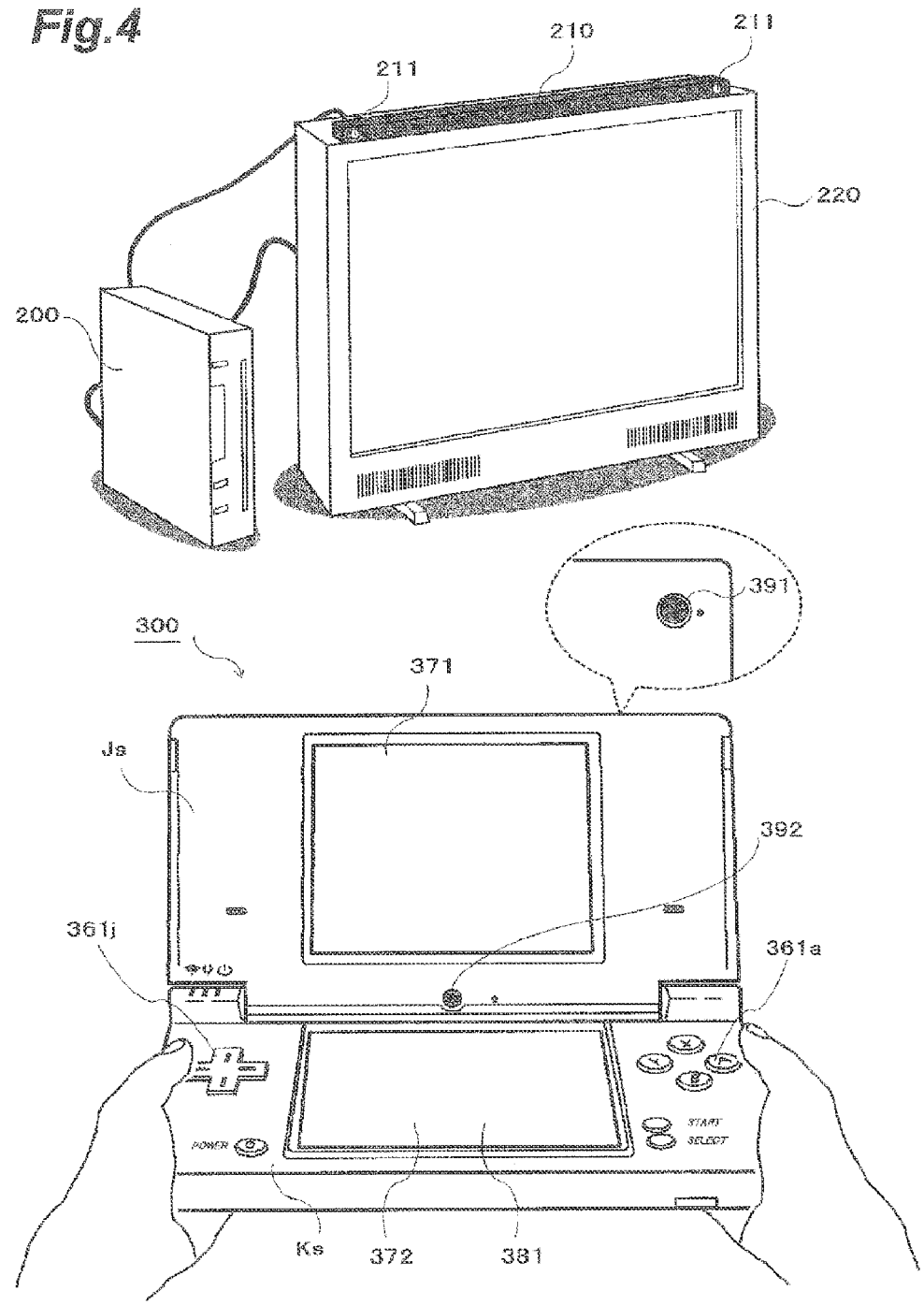

In the following, description will be given of an arrangement of the above-described stationary game console 200 and the above-described portable game console 300 with reference to FIG. 4. FIG. 4 is an external view illustrating an arrangement and the like of the stationary game console 200 and the portable game console 300 (where a single portable game console 300 is provided as an example). As shown in FIG. 4, the stationary game console 200 and the portable game console 300 are arranged to have a predetermined distance therebetween. The portable game console 300 is held by a player to face the display 220.

As shown in FIG. 4, the light-emitting module 210 and the display 220 are connected to the stationary game console 200. The light-emitting module 210 is formed in a stick shape of a predetermined length, for example, and is fixed to an upper part of the display 220 while being arranged in the direction along the screen. The light-emitting module 210 includes an infrared-emitting element 211 embedded in each end. The number of the embedded infrared-emitting elements 211 is an example and may be larger than the above-described number. The light-emitting module 210 causes each infrared-emitting element 211 to emit light as appropriate by receiving power supply from the stationary game console 200.

Meanwhile, each component of the portable game console 300 is integrated into an upper chassis Js and a lower chassis Ks respectively. For example, the first display 371, the inner camera 392, and the like are integrated in the upper chassis Js, while the outer camera 391 is integrated in the back (outer side) of the upper chassis Js. Moreover, the operation key 361 (including a cross key 361j and an A-button 361a, as an example), the second display 372, the touch panel 381, and the like are integrated in the lower chassis Ks. A player holds the portable game console 300 thus configured, with both hands so that the outer camera 391 would stay facing the display 220 (the light-emitting module 210). In other words, the player plays the game while keeping an optical axis of the outer camera 391 within the display 220.

More specifically, when the outer camera 391 captures an image including the two infrared-emitting elements 211 of the light-emitting module 210 (two light-emitting dots), through the above-described infrared filter, the portable game console 300 detects a position, a direction, and the like of the portable game console 300 with respect to the display 220 (the light-emitting module 210) based on positional relationship and the like of the two light-emitting dots. For example, the process controller 310 analyzes positional relationship and the like of the two light-emitting dots included in the image captured by the outer camera 391, calculates a spatial position of the portable game console 300 and a direction (direction of the optical axis) of the outer camera 391, and finally detects a part of the display 220 aimed by the player via the portable game console 300 (the outer camera 391), that is, a target region. Such detection of a target region is performed every vertical-synchronization interrupt (1/60 second), for example.

Note that such a technique for detecting a target region by using light-emitting dots is an example, and hence a different technique may be used to detect a part of the display 220 aimed by the player via the portable game console 300. For example, different marker images (two-dimensional codes or the like, as an example) may be displayed at fixed positions distributed appropriately in the display 220, and a target region may be detected when the portable game console 300 recognizes marker images included in an image captured by the outer camera 391. Alternatively, a plurality of cards each including a marker image or the like printed thereon (AR cards or the like) may be arranged around the display 220 appropriately, and a target region may be detected based on positional relationship of marker images or the like included in an image captured by the outer camera 391. Alternatively, when the portable game console 300 includes an acceleration sensor or the like, for example, the game may be started in a state where the portable game console 300 (the outer camera 391) is aimed at an initial position in the display 220, and moves of the portable game console 300 may be obtained sequentially from values of the acceleration sensor or the like, thereby a current target region being detected. In other words, a technique used to detect a target region may be optional and can be changed appropriately depending on concrete hardware and the like.

In the following, description will be given of an overview of the first device implemented by the above-described stationary game console 200 and an overview of the second device implemented by the above-described portable game console 300, with reference to the drawings. To facilitate understanding of the present disclosure, each of the first device and the second device will be described by taking a case of playing a "goldfish scooping" game as an example.

Note that actual goldfish scooping is played in a fair stall and the like and is a game of scooping goldfish in a fish tank by using a tool made by stretching a thin piece of paper on a frame (a poi). Since the piece of paper stretched on the frame easily breaks when getting wet, a player finds joy in attempting scooping goldfish before the paper breaks. A goldfish scooping game of the invention of the present application enables such actual goldfish scooping to be performed in virtual space. As an example, an overall view of a fish tank (water surface) in which goldfish are swimming is displayed on the large screen of the first device while a part of the fish tank is displayed on the small screen of the second device. This enables a player using the second device to perform at hand an operation of scooping a target goldfish while checking moves and the like of the goldfish.

(Configuration of First Device)

Figure 5:
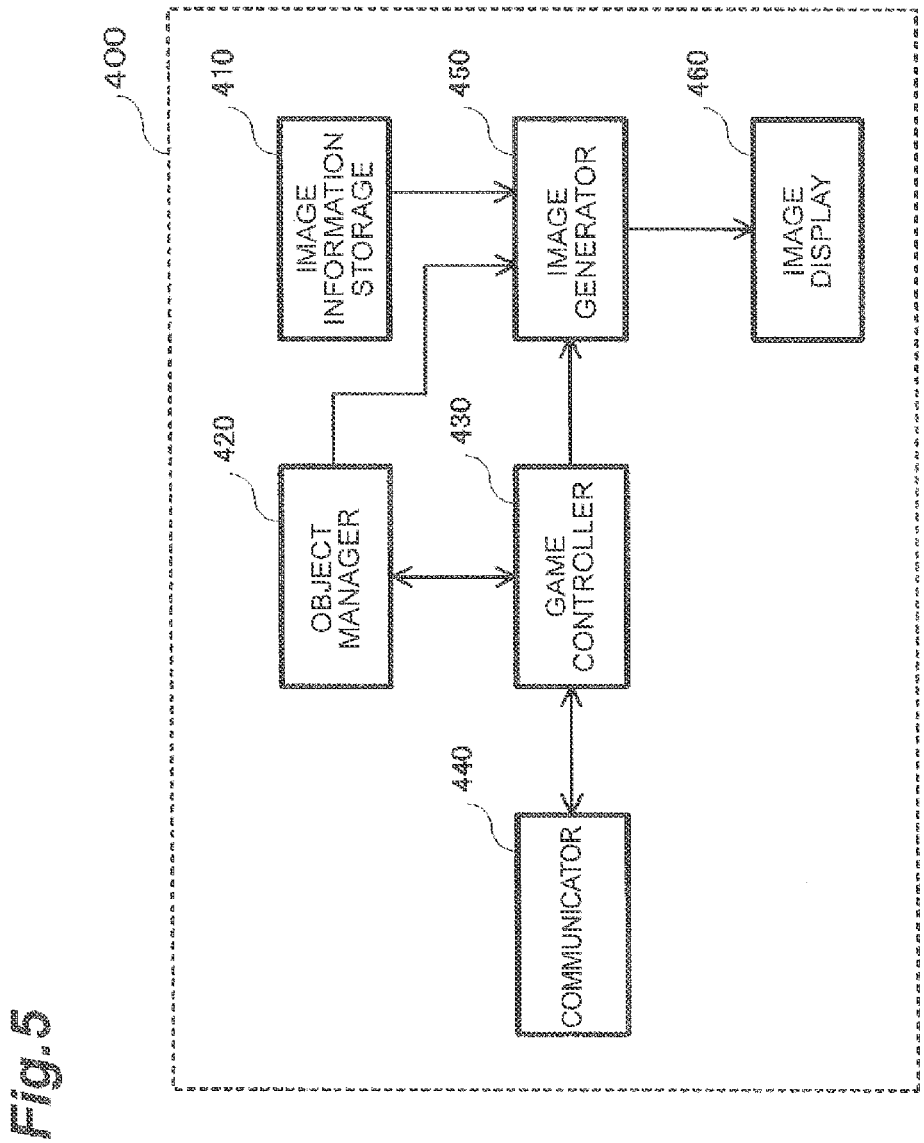
FIG. 5 is a block diagram illustrating a schematic configuration of the first device according to this embodiment.

FIG. 5 is a block diagram showing a schematic configuration of a first device 400 implemented by the above-described stationary game console 200. The first device 400 carries out a goldfish scooping game based on operations by a player using a second device (a second device 500 to be described later) while displaying an overall view of the game, for example. In the following, the first device 400 will be described with reference to FIG. 5.

As shown in FIG. 5, the first device 400 comprises an image information storage 410, an object manager 420, a game controller 430, a communicator 440, an image generator 450, and an image display 460.

The image information storage 410 stores various kinds of image information to be needed in the goldfish scooping game. For example, the image information storage 410 stores images of objects such as goldfish. Specifically, the image information storage 410 stores various images of goldfish different in kind, color, size and the like. In addition, the image information storage 410 also stores images of edges of the fish tank, sandals around the fish tank, a water surface caused to become wavy due to moves or the like of goldfish, and the like. Note that the DVD-ROM or the like loaded into the above-described DVD-ROM drive 206 can function as the image information storage 410 thus configured.

The object manager 420 manages a current state of each object moving in the virtual space as appropriate. In other words, the object manager 420 manages a current position and the like of each goldfish swimming in the fish tank in the virtual space. For example, the object manager 420 manages a current state of each goldfish by updating a management table as the one shown in FIG. 6, when needed. Specifically, an object ID is assigned to each goldfish for identification, and a current position (a position of a representative point such as the center, for example), a direction, a level of difficulty, a move state, a catch state, and the like are managed for each object ID. Here, the level of difficulty indicates capturability (scoopability) of the goldfish by a numerical value and increases as the numerical value becomes larger. In addition, the move state indicates a current state of moving (including stopping) of the goldfish. Moreover, the catch state indicates whether the goldfish is caught. When a goldfish is caught, the current position, the direction, and the move state are cleared, and the goldfish is excluded from the display objects. Note that the above-described RAM 203 or the like can function as the object manager 420 thus configured.

Return to FIG. 5. The game controller 430 controls the entire goldfish scooping game. Specifically, the game controller 430 controls the object manager 420, to update the above-described management table in FIG. 6 when needed, and thereby move each goldfish (cause each goldfish to swim in the virtual fish tank). For example, the game controller 430 moves each goldfish appropriately, depending on a level of difficulty in the management table. As an example, for a goldfish having a low level of difficulty, the current position and the like in the management table are updated so that the goldfish would stop frequently, move a short distance (slowly) when moving, and not change direction frequently, for example. By contrast, for a goldfish having a high level of difficulty, the current position and the like in the management table are updated so that the goldfish would stop less frequently, move a long distance (quickly) when moving, and changes direction frequently, for example. Thereafter, the game controller 430 transmits the current position and the like (positional information) in the management table thus updated, to each second device (a second device 500 to be described later) via the communicator 440. Moreover, upon acquisition of selection information (catch information) transmitted by the second device via the communicator 440, the game controller 430 updates the management table according to the selection information. For example, when catch information is acquired indicating that a goldfish is caught, the catch state of the goldfish (object ID) is updated to "caught", and then the current position, the direction, and the move state are cleared. The above-described CPU 201 or the like can function as the game controller 430 thus configured.

Return to FIG. 5. The communicator 440 transmits and receives necessary information to and from each second device (a second device 500 to be described later). For example, the communicator 440 broadcasts the current position and the like (positional information) in the management table updated by the game controller 430, to all the second devices. Moreover, the communicator 440 receives selection information (catch information) transmitted by each second device. The above-described NIC 209 or the like can function as the communicator 440 thus configured.

Figure 7:
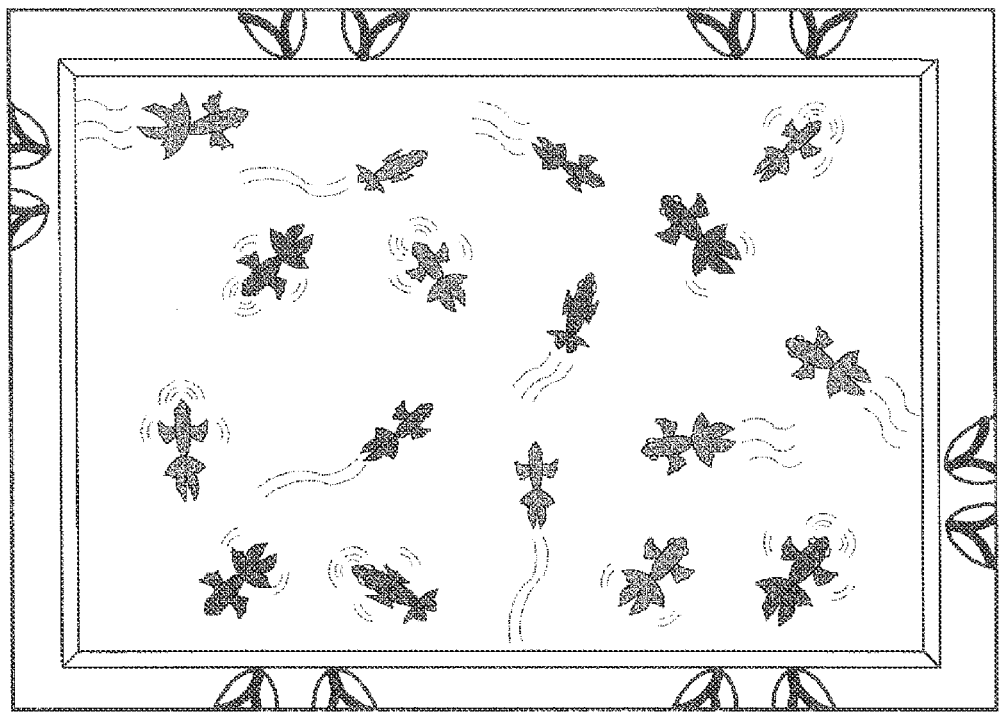
FIG. 7 is a schematic view illustrating an example of a game image (overall view) generated by the first device.

The image generator 450 generates a game image for the goldfish scooping game. Specifically, the image generator 450 generates an image with goldfish swimming in the virtual fish tank, with reference to the image information storage 410 and the object manager 420. For example, the image generator 450 reads out image information of each goldfish from the image information storage 410 and then generates an image including goldfish each arranged according to a current position and a direction of each object in the above-described management table in FIG. 6. In particular, a game image as the one shown in FIG. 7 is generated. Specifically, a game image representing a view looking down, from above (in a vertical direction with respect to water surface), the fish tank with goldfish swimming therein, is generated. Such a game image is an example, and a game image representing a perspective view looking down the fish tank obliquely from above, for example, may be alternatively generated. Moreover, although an overall view of the fish tank with goldfish swimming therein is shown in FIG. 7, a game image of a relatively wide area of the fish tank may be generated, instead of the overall view. Note that the above-described image processor 207 or the like can function as the image generator 450 thus configured.

Return to FIG. 5. The image display 460 displays a game image generated by the image generator 450. Specifically, the image display 460 displays a game image (an overall view of the fish tank with goldfish swimming therein) as the above-described one shown in FIG. 7. Note that the above-described display 220 or the like can function as the image display 460 thus configured.

(Configuration of Second Device)

Figure 8:
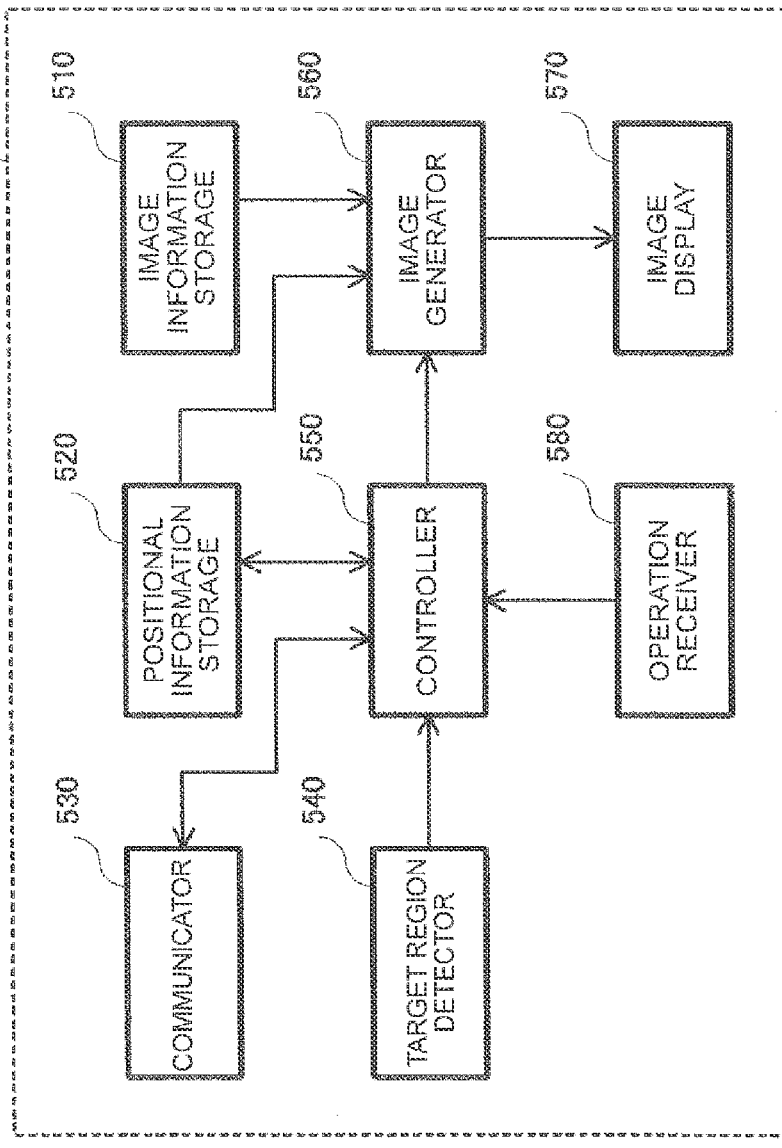
FIG. 8 is a block diagram illustrating a schematic configuration of the second device according to this embodiment.

FIG. 8 is a block diagram showing a schematic configuration of a second device 500 implemented by the above-described portable game console 300. The second device 500 displays a game image of a target region (a part of the fish tank), which is a small area, of the game image (overall view) displayed on the image display 460 (the display 220) of the above-described first device 400, and at the same time determines whether displayed goldfish is caught (scooped) by an operation of a player. In the following, description will be given of the second device 500 with reference to FIG. 8.

As shown in FIG. 8, the second device 500 comprises an image information storage 510, a positional information storage 520, a communicator 530, a target region detector 540, a controller 550, an image generator 560, an image display 570, and an operation receiver 580.

The image information storage 510 stores various kinds of image information to be needed in the goldfish scooping game in the second device 500. For example, the image information storage 510 stores images of objects such as goldfish. Specifically, various images of goldfish different in kind, color, size, and the like are stored. In addition, the image information storage 510 also stores images of a poi for scooping goldfish (a tool with a piece of water-soluble paper or the like stretched on a frame), edges of the fish tank, sandals around the fish tank, a water surface caused to become wavy due to moves of goldfish, and the like. Note that the above-described ROM 331 of the cartridge 330 or the like can function as the image information storage 510 thus configured.

The positional information storage 520 stores positional information such as a current position and a direction of each goldfish. For example, upon receipt of a current position and a direction of the goldfish transmitted from the first device 400 via the communicator 530, the positional information storage 520 stores the positional information. Specifically, when the positional information (such as the current position and the direction) in the management table in FIG. 6 is updated in the first device 400, the updated positional information is transmitted to the second device 500 and is then stored in the positional information storage 520. In this way, the positional information of each goldfish managed in the first device 400 is also stored in the second device 500 (the positional information storage 520). In addition, the positional information storage 520 also stores positional information of the poi (for example, a range of a frame of the poi and the like). Note that the above-described WRAM 315 or the like can function as the positional information storage 520 thus configured.

The communicator 530 transmits and receives necessary information to and from the above-described first device 400. For example, the communicator 530 receives positional information such as the current position and the like of the goldfish transmitted from the first device 400. Moreover, upon selection of an object by an operation on the second device 500, the communicator 530 transmits selection information (catch information) to the first device 400. Specifically, when the second device 500 determines that a goldfish is scooped (caught), the catch information of the goldfish is transmitted to the first device 400. For example, the communicator 530 transmits catch information including an object ID of the caught goldfish to the first device 400. Note that the wireless communicator 341 and the communication controller 342 described above or the like can function as the communicator 530 thus configured.

The target region detector 540 detects a target region at which a player (the second device 500) is aiming, in the image display 460 (the display 220) of the first device 400. For example, as described above, the target region detector 540 analyzes positional relationship and the like of two light-emitting dots (the infrared-emitting elements 211) included in an image captured by the outer camera 391, calculates a spatial position of the portable game console 300 and a direction (direction of the optical axis) of the outer camera 391, and finally detects a target region in the display 220. Alternatively, when the stationary game console 200 (the first device 400) displays different marker images (two-dimensional codes or the like, as an example) at fixed positions distributed appropriately in the display 220, the target region detector 540 may detect a target region by recognizing marker images included in an image captured by the outer camera 391. Alternatively, when a plurality of cards each including a marker image or the like printed thereon (AR cards or the like) are arranged around the display 220 appropriately, the target region detector 540 may detect a target region based on positional relationship of the marker images or the like included in an image captured by the outer camera 391. Alternatively, when the second device 500 includes an acceleration sensor or the like, for example, the game may be started in a state where the outer camera 391 is aimed at an initial position in the display 220, and moves of the second device 500 may be sequentially obtained from values of the acceleration sensor or the like, and thereby the target region detector 540 may detect a current target region. In other words, a technique used to detect a target region can be changed appropriately depending on concrete hardware and the like. Note that the outer camera 391 and the CPU core 311 described above, or the like, can function as the target region detector 540 thus configured.

The controller 550 controls the goldfish scooping game in the second device 500. In other words, the controller 550 controls the image generator 560 so that the image generator 560 would generate a game image of the target region detected by the target region detector 540. Moreover, the controller 550 determines whether a goldfish is caught (scooped) based on an operation of a player or the like received by the operation receiver 580. Specifically, the controller 550 performs such control that the poi for scooping goldfish would be placed into water when a player presses the above-described A-button 361*a*, and that the poi would be pulled up from water when the player releases (stops pressing) the A-button 361*a* subsequently. Then, based on relationship between a position of the poi (specifically, a range of the frame on which a piece of paper is stretched) and a position of a goldfish (specifically, the central position of the goldfish) at the time of pulling up the poi from water, the controller 550 determines whether the goldfish is caught. For example, when the poi is pulled up from water while the central position of the goldfish is within the range of the frame of the poi, the controller 550 determines that the goldfish is caught successfully. By contrast, when the poi is pulled up while the central position of the goldfish is outside the range of the frame of the poi, the controller 550 determines that catching of the goldfish results in failure. Note that the catching process will be described more concretely, in association with a game image in the second device 500 to be described later. When the goldfish is caught, the controller 550 transmits catch information including an object ID of the goldfish to the first device 400 via the communicator 530. Moreover, the controller 550 times a period in which the poi is held in water. Then, the controller 550 calculates a total of the time periods and then determines that the poi is broken (the paper is torn, or the like) when the total time exceeds a predetermined time, thereby determining that the game is over for the player. Note that the above-described CPU core 311 or the like can function as the controller 550 thus configured.

The image generator 560 generates a game image in the second device 500. In other words, the image generator 560 generates an image of the target region detected by the target region detector 540, with reference to the image information storage 510 and the positional information storage 520. For example, the image generator 560 reads out image information of a target goldfish in the target region detected by the target region detector 540, from the image information storage 510, and thereby generates an image with the goldfish each arranged according to a current position and a direction of each object stored in the positional information storage 520. Moreover, an image of the poi for scooping goldfish is arranged at any one of four fixed positions (upper, lower, left, and right). In particular, the image generator 560 generates a game image as the one shown in FIG. 9A. Specifically, the image generator 560 generates a game image of the target region, which is a small area, compared with an overall view of the game image in FIG. 7 generated in the first device 400. In other words, a partial game image including objects such as goldfishes KO1 to KO4, and a poi PO for scooping goldfish, in the target region, is generated in the second device 500. Thus, in the second device 500, a game image representing a zoom view of the target region is generated.

Figure 9A:
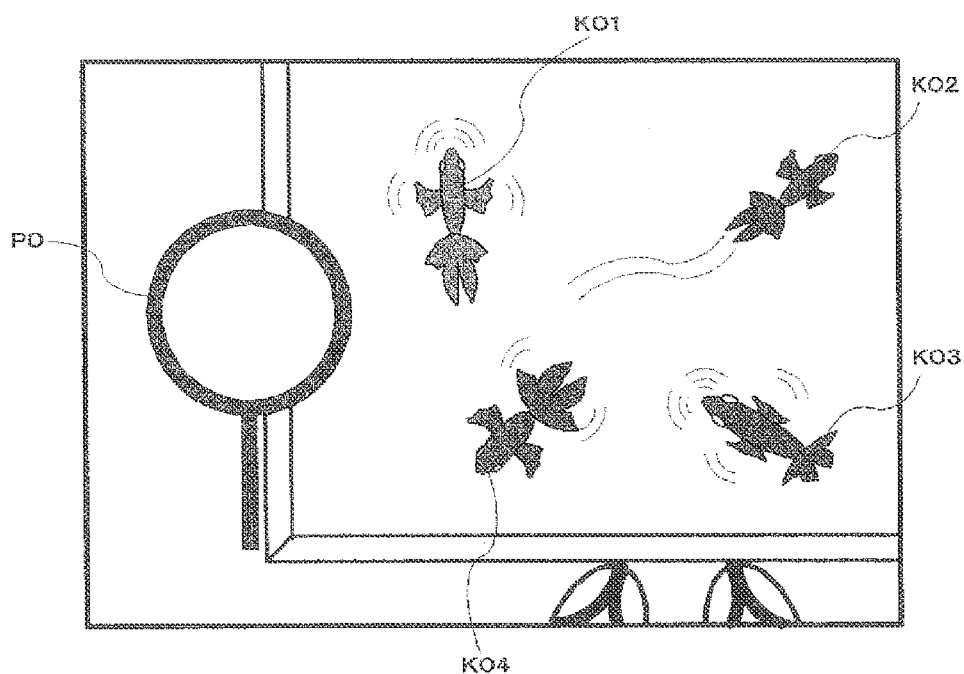
FIG. 9A is a schematic view illustrating an example of a game image (in a target region) generated by the second device.
Figure 9B:
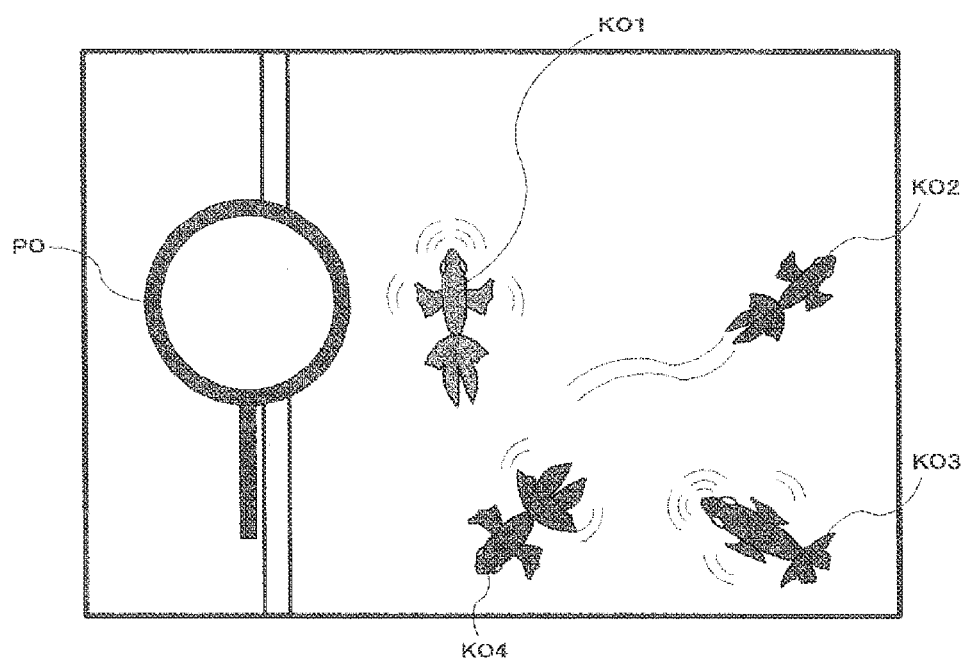
FIG. 9B is a schematic view illustrating an example of a game image (in a target region) generated by the second device.

In the case shown in FIG. 9A, an image of the poi PO is generated at a fixed position in a left part of the screen, specifically, generated so that the center of the paper of the poi PO would be positioned in a left central part of the screen, as an example. Four fixed positions for the poi PO are defined, that is, an upper part, a lower part, a left part, and a right part of the screen, for example, and the position can be changed according to a press (up, down, left or right) of the cross key 361j to be described later. Here, as long as the fixed position is not changed, the poi PO remains at the same position in the screen even when the target region is changed (the second device 500 is moved). For example, when the player shifts the target region upward from the state shown in FIG. 9A (specifically, the player shifts the target region in the display 220 toward the light-emitting module 210 by pulling the upper part of the portable game console 300 toward the player), the image generator 560 generates a game image as the one shown in FIG. 9B. In other words, a position of each of the goldfishes KO1 to KO4 moves relatively downward while the position of the poi PO does not change.

Figure 10A:
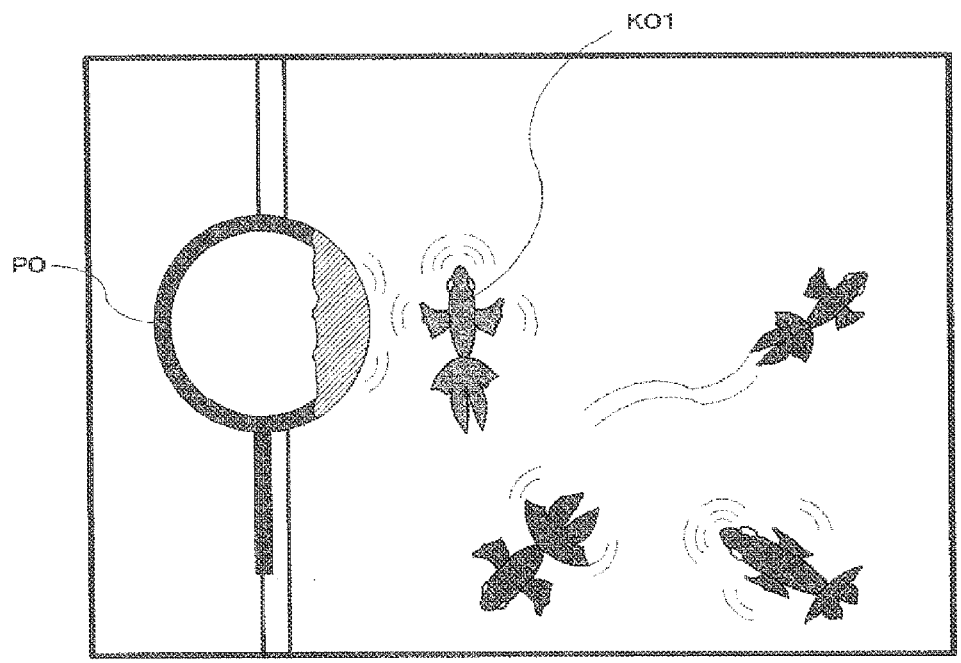
FIG. 10A is a schematic view illustrating relationship between a poi and a goldfish.
Figure 10B:
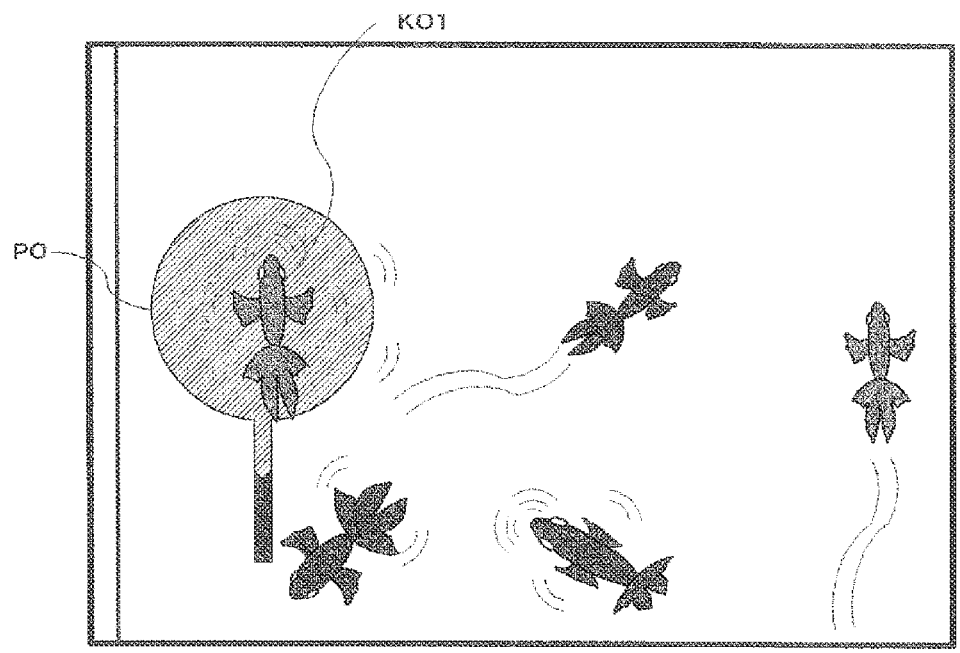
FIG. 10B is a schematic view illustrating relationship between the poi and the goldfish.

Moreover, when the player presses the above-described A-button 361a, the image generator 560 generates a game image with the poi placed into water. Specifically, when the A-button 361a is pressed in the state shown in FIG. 9B, the image generator 560 generates a game image with the inner side (right side) of the poi PO placed into water, as shown in FIG. 10A. When the A-button 361a is kept pressed, almost the entire part of the poi PO (the entire part of the paper) is placed into water and is kept approximately parallel at a predetermined depth (a depth deep enough to scoop a goldfish). When the player aiming at the goldfish KO1 shifts the target region to the right while keeping pressing the A-button 361a (specifically, when shifting the target region in the display 220 toward the right edge of the display 220 by pulling the right side of the portable game console 300), the image generator 560 generates a game image as the one shown in FIG. 10B. In other words, positions of the goldfish KO1 and the like move relatively to the left while the position of the poi PO in water does not change, and hence the poi PO results in being positioned behind (below) the goldfish KO1.

Figure 11A:
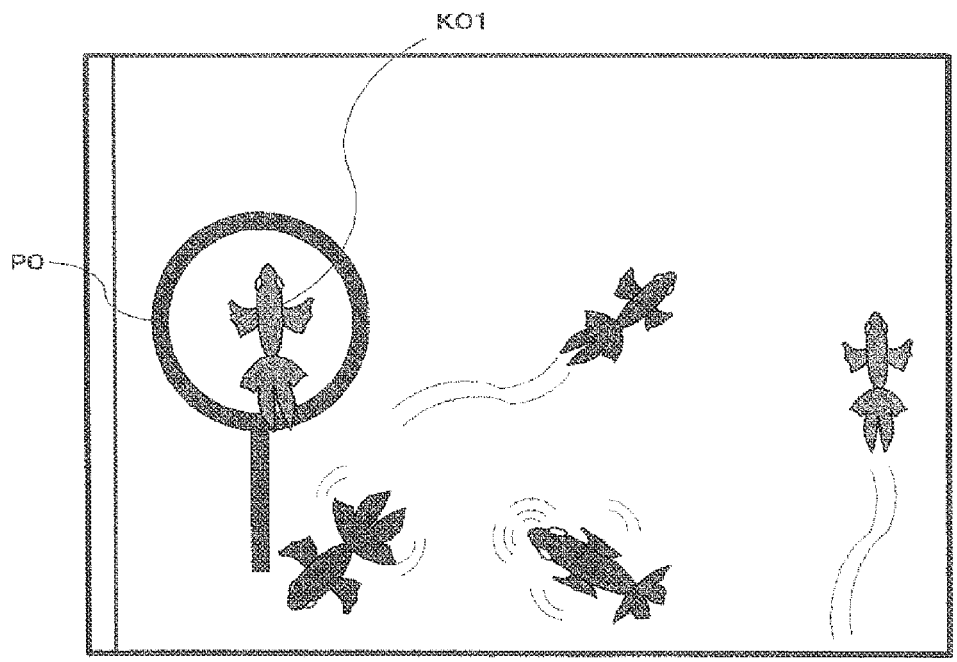
FIG. 11A is a schematic view illustrating catching of the goldfish.
Figure 11B:
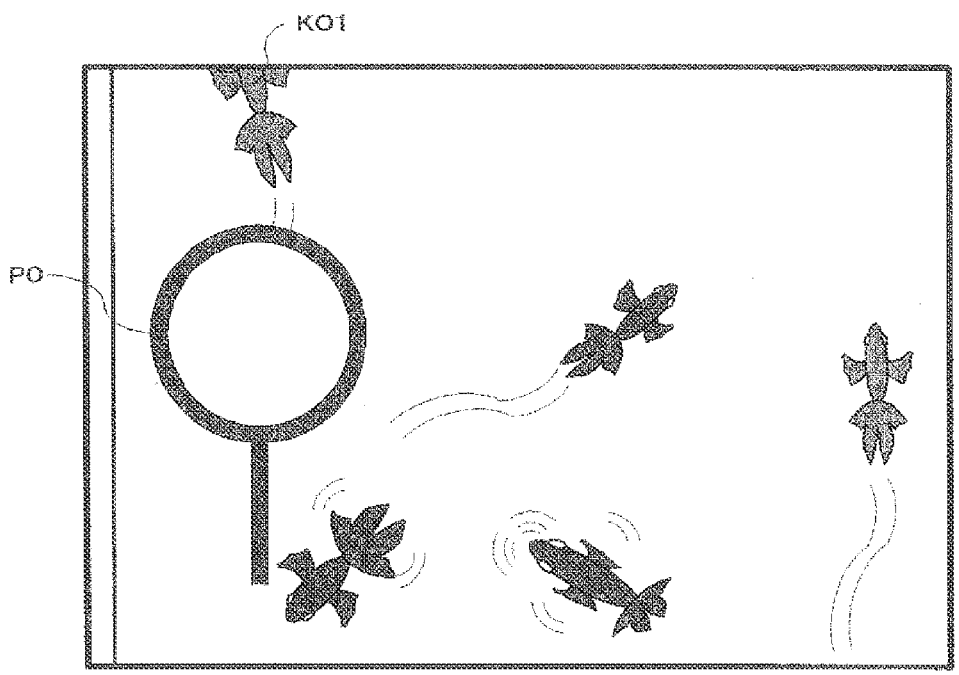
FIG. 11B is a schematic view illustrating failure in catching the goldfish.

Then, when the pressed A-button 361a is released, the image generator 560 generates a game image with the poi pulled up from water in the same state. Specifically, when the A-button 361a is released in the state shown in FIG. 10B (where the goldfish KO1 is in a standstill state), the image generator 560 generates a game image with the poi PO pulled up from water while keeping the goldfish KO1 thereon, as shown in FIG. 11A. The above-described controller 550 determines that the goldfish KO1 is caught successfully (the goldfish KO1 is scooped) since the central position of the goldfish KO1 is within a range of the frame of the poi PO in this state. By contrast, when the A-button 361a is released after the goldfish KO1 starts to swim quickly from the state shown in FIG. 10B, the image generator 560 generates a game image with the poi PO pulled up from water without having anything thereon, as shown in FIG. 11B. The above-described controller 550 determines that catching of the goldfish KO1 results in failure (none of goldfish is caught), since the central position of the goldfish KO1 is outside the range of the frame of the poi PO in this state.

As shown in FIGS. 9 to 11, the image generator 560 generates a game image (partial) of a view looking down, from the above (in a vertical direction with respect to water surface), the fish tank with goldfish swimming therein, however, such a game image is an example. In other words, a game image (partial) of a perspective view looking down the fish tank obliquely from the above, for example, may be alternatively generated. Moreover, a further zoomed view in the target region, or by contrast a zoomed-out view of the target region showing a reduced display, may be implemented. Note that the above-described image processor 312 or the like can function as the image generator 560 thus configured.

Return to FIG. 8. The image display 570 displays a game image generated by the image generator 560. Specifically, the game images as the above-described ones (game images of the target regions) shown in FIGS. 9 to 11 are displayed. Note that the first display 371 and the second display 372 described above or the like can function as the image display 570 thus configured.

The operation receiver 580 receives an operation performed on each key, each button, and the like by a player. For example, when the player presses the above-described cross key 361j, the operation receiver 580 receives operation information corresponding to the pressed direction (up, down, left, or right). Moreover, when the player presses the above-described A-button 361a, the operation receiver 580 receives operation information corresponding to the pressed button. The operation receiver 580 passes the operation information thus received to the controller 550. Accordingly, upon acquisition of the operation information based on a press of the cross key 361j, the above-described controller 550 changes the fixed position for displaying the poi according to the pressed direction (up, down, left, or right) as described above. Moreover, upon acquisition of the operation information based on a press of the A-button, the controller 550 performs control to place the poi into water as described above. Note that the above-described operation key 361 can function as the key operation receiver 150 thus configured. Alternatively, the operation receiver 580 may receive an operation by a player via the above-described touch panel 381.

(Overview of Operations of First Device and Second Device)

Figure 12:
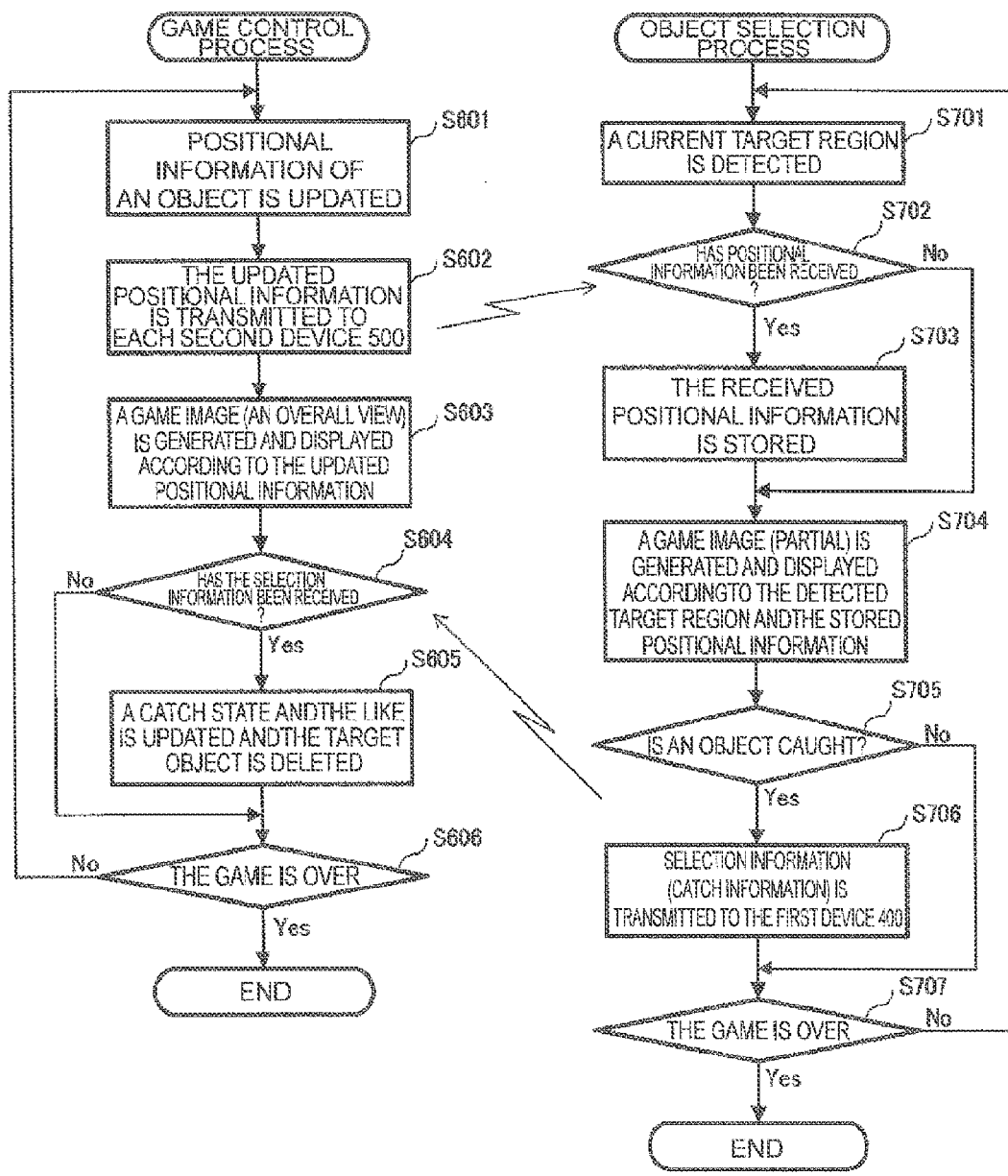
FIG. 12 is a flowchart illustrating a game control process and an object selection process according to this embodiment.

In the following, description will be given of operations of the first device 400 and each second device 500 thus configured, with reference to the drawings. FIG. 12 is flowcharts showing a flow of a game control process carried out by the first device 400 and a flow of an object selection process carried out by each second device 500. The processes are started when an instruction to play the goldfish scooping game is issued, in a state where the wireless connection of the first device 400 and the second device 500 is established, for example.

First, the first device 400 updates positional information of an object (Step S601). Specifically, the game controller 430 controls the object manager 420 to update the current position and the direction in the above-described management table in FIG. 6 as appropriate, thereby moving each goldfish (causing the goldfish to swim in the virtual fish tank). As an example, the game controller 430 updates the current position and the like in the management table so that a goldfish having a low level of difficulty would stop frequently, move a short distance (slowly) when moving, and not change direction frequently, for example. By contrast, the current position and the like in the management table are updated so that a goldfish having a high level of difficulty would stop less frequently, move a long distance (quickly) when moving, and change direction frequently, for example.

The first device 400 transmits the updated positional information to each second device 500 (Step S602). Specifically, the communicator 440 broadcasts, to all the second devices 500, the current position and the like (positional information) in the management table updated by the game controller 430.

The first device 400 generates and displays a game image (an overall view) according to the updated positional information (Step S603). Specifically, the image generator 450 generates an image with goldfish swimming in the virtual fish tank, with reference to the image information storage 410 and the object manager 420. For example, the image generator 450 reads out image information of each goldfish from the image information storage 410, and then generates an image with the goldfish each arranged according to the current position and the direction of each object in the above-described management table in FIG. 6. In particular, the image generator 450 generates a game image as the above-described one shown in FIG. 7. Specifically, the image generator 450 generates a game image of a view looking down, from above (in a vertical direction with respect to water surface), the fish tank with goldfish swimming therein. Then, such a game image (an overall view of the fish tank with goldfish swimming therein) is displayed on the image display 460.

Meanwhile, the second device 500 (each second device 500) detects a current target region (Step S701). Specifically, the target region detector 540 detects a target region at which a player (the second device 500) is aiming, in the image display 460 (the display 220) of the first device 400. For example, as described above, the target region detector 540 analyzes positional relationship and the like of two light-emitting dots (the infrared-emitting elements 211) included in an image captured by the outer camera 391, calculates a spatial position of the portable game console 300 and a direction (direction of the optical axis) of the outer camera 391, and finally detects a target region in the display 220. Note that a technique used to detect a target region can be changed appropriately depending on concrete hardware and the like, as described above.

The second device 500 determines whether or not positional information has been received (Step S702). Specifically, the communicator 530 determines whether the positional information transmitted from the first device 400 in Step S602 described above has been received. When determining that the positional information has not been received (Step S702; No), the second device 500 advances the process to Step S704 to be described later.

By contrast, when determining that the positional information has been received (Step S702; Yes), the second device 500 stores the received positional information (Step S703). Specifically, upon receipt of the current position and the direction of the goldfish transmitted from the first device 400 via the communicator 530, the positional information storage 520 stores the positional information. In other words, when the positional information (the current position and the direction) in the management table in FIG. 6 is updated in the first device 400, the positional information is transmitted to the second device 500, and is then stored in the positional information storage 520. In this way, the positional information of each goldfish managed by the first device 400 is also stored in the second device 500 (the positional information storage 520).

The second device 500 generates and displays a game image (partial) according to the detected target region and the stored positional information (Step S704). Specifically, the image generator 560 generates an image in the target region detected by the target region detector 540, with reference to the image information storage 510 and the positional information storage 520. For example, the image generator 560 reads out image information of each target goldfish in the target region detected by the target region detector 540, from the image information storage 510, and thereby generates an image with the goldfish each arranged according to the current position and the direction of each object stored in the positional information storage 520. Moreover, the image of the poi for scooping goldfish is arranged at any one of four fixed positions (upper, lower, left and right). In particular, the image generator 560 generates game images as those shown in FIGS. 9A and 9B described above. Specifically, a game image in the target region, which is a small area, compared with an overall view of the game image in FIG. 7 generated in the first device 400. In other words, the image generator 560 generates a partial game image including objects such as the goldfishes KO1 to KO4, and the poi PO for scooping goldfish, and the like, in the target region, thereby displaying the game image on the image display 570. Hence, in the second device 500, a game image showing a zoomed view of the target region is displayed on the screen at hand.

The second device 500 determines whether or not an object is caught by a catch operation of a player (Step S705). Specifically, the controller 550 determines whether a goldfish is caught (scooped) by an operation of a player or the like received by the operation receiver 580. For example, as described above, the controller 550 performs control to place the poi for scooping goldfish into water, when the player presses the A-button 361a, and to pull up the poi from water, when the player releases (stops pressing) the A-button 361a subsequently. Then, based on relationship between a position (range) of the poi and a position of the goldfish at the time of pulling up the poi from water, the controller 550 determines whether the goldfish is caught. In particular, as shown in FIG. 11A described above, when the poi PO is pulled up from water while the goldfish KO1 is positioned on the poi PO (more specifically, when the central position of the goldfish KO1 is within a range of the frame of the poi PO), the controller 550 determines that the goldfish KO1 is caught successfully (the goldfish KO1 is scooped). By contrast, as shown in FIG. 11B described above, when the poi PO is pulled up from water without anything positioned thereon since the goldfish KO1 has moved away (more specifically, when the central position of the goldfish KO1 is outside the range of the frame of the poi PO), the controller 550 determines that catching of the goldfish KO1 results in failure (none of goldfish is scooped). When determining that no object is caught (Step S705; No), the second device 500 advances the process to Step S707 to be described later.

By contrast, when determining that an object is caught (Step S705; Yes), the second device 500 transmits selection information (catch information) to the first device 400 (Step S706). Specifically, the communicator 530 transmits the catch information of the caught goldfish to the first device 400. For example, the catch information including an object ID) of the caught goldfish is transmitted to the first device 400.

The second device 500 determines whether or not the game is over (Step S707). Specifically, the controller 550 determines whether the game is over in the second device 500. For example, the controller 550 times a period in which the poi is held in water, and then determines that the poi is broken (the paper is torn, or the like) when a total of the timed periods exceeds a predetermined time, thereby determining that the game is over for the player. Alternatively, the controller 550 may time an elapsed time from the start of the game and then determine that the game is over for the player when the elapsed time exceeds a predetermined time, or the like. When determining that the game is not over (Step S707; No), the second device 500 returns the process to Step S701 and repeats the operations in Steps S701 to S707 described above. By contrast, when determining that the game is over (Step S707; Yes), the second device 500 terminates the object selection process by displaying a result (the number of caught goldfish, and the like) of the player, for example.

Return the description to the process by the first device 400. The first device 400 determines whether or not selection information has been received (Step S604). Specifically, the communicator 440 determines whether the selection information (catch information) transmitted by the second device 500 in Step S706 described above has been received. When determining that the selection information has not been received (Step S604; No), the first device 400 advances the process to Step S606 to be described later.

By contrast, when determining that the selection information has been received (Step S604; Yes), the first device 400 updates a catch state and the like of the target object based on the received selection information and thereafter deletes the target object (Step S605). Specifically, upon acquisition of the selection information (catch information) transmitted from the second device 500 via the communicator 440, the game controller 430 controls the object manager 420 to update the catch state of the caught goldfish (the object ID) in the management table in FIG. 6 to caught and then to clear the current position, the direction, and a move state. Thereby, the caught goldfish is excluded (deleted) from the objects to be displayed on the image display 460. Subsequently, the positional information thus cleared is broadcasted to each second device 500, and hence the caught goldfish is also excluded (deleted) from the objects to be displayed on the image display 570.

The first device 400 determines whether or not the game is over (Step S606). Specifically, the game controller 430 determines whether the goldfish scooping game is over. For example, the game controller 430 may time an elapsed time from the start of the game and then determine that the goldfish scooping game is over, when the elapsed time exceeds a predetermined time, or the like. Alternatively, the game controller 430 may count the number of goldfish caught by each player (each second device 500) and determine that the goldfish scooping game is over, when the total number exceeds a predetermined number, or the like. When determining that the game is not over (Step S606; No), the first device 400 returns the process to Step S601 and repeats the operations in Steps S601 to S606 described above. By contrast, when determining that the game is over (Step S606; Yes), the first device 400 terminates the game control process by displaying a result (the number of caught goldfish, and the like) of each player, for example.

As described above, the second device 500 operated by a player detects a target region in the screen (for example, the large remote screen) of the first device 400 and then displays an image including objects in the target region. This enables a player to perform selection information (catch information or the like) while checking objects (moves of the goldfish and the like) in the target region, for example, on the small screen at hand. Moreover, when the selection information (catch information or the like) of an object is performed, the second device 500 generates selection information (catch information or the like) of the object, and then transmits the selection information to the first device 400. Then, the first device 400 carries out a process (a process of deleting the caught goldfish or the like) for the selected object based on the selection information. In this way, a player can easily perform the operation of selecting an object displayed on the remote screen, on the screen at hand.

(Different Embodiments)

Figure 13A:
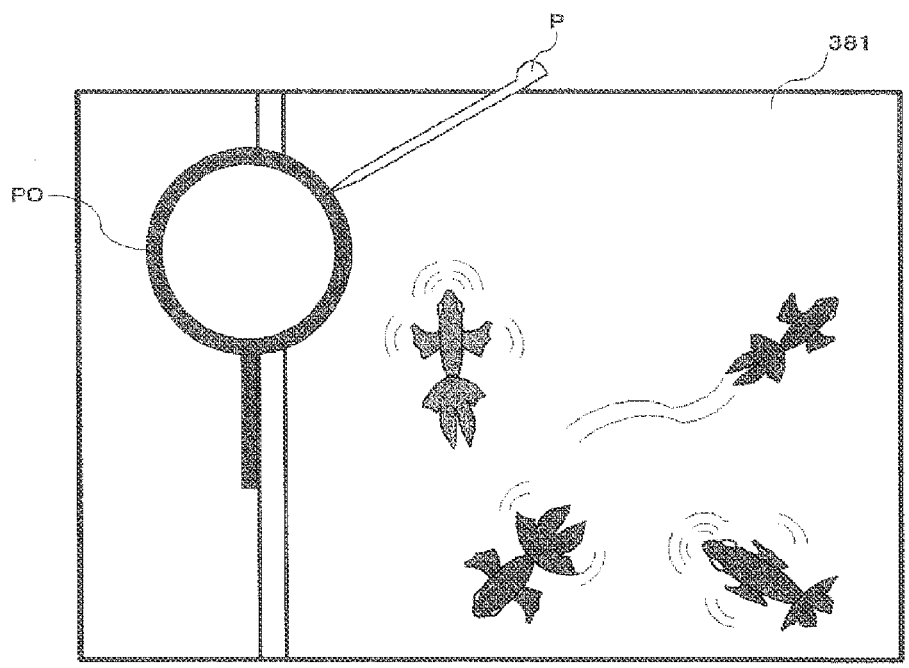
FIG. 13A is a schematic view illustrating an example of an operation for catching a goldfish according to a different embodiment.
Figure 13B:
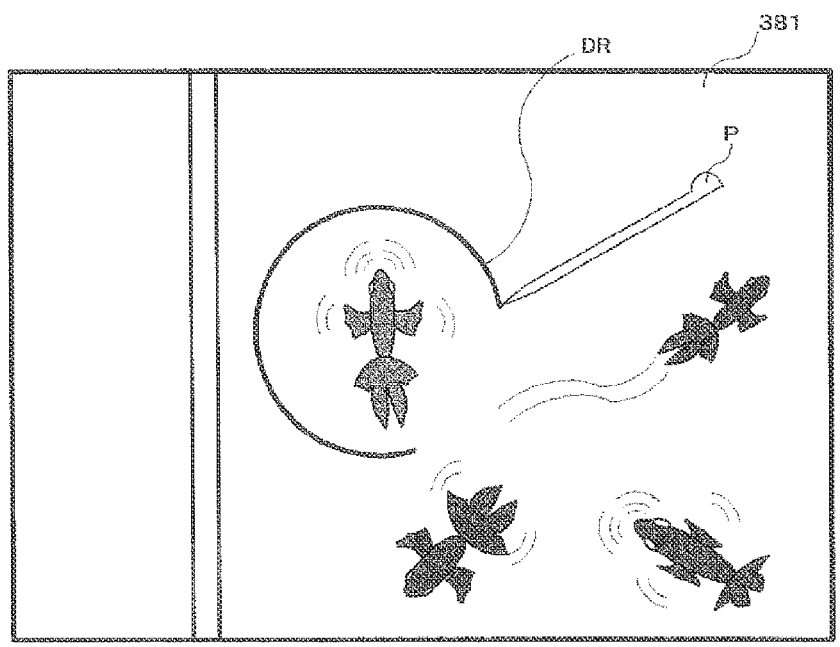
FIG. 13B is a schematic view illustrating an example of the operation for catching the goldfish according to the different embodiment.

In the above-described embodiment, description has been given of the case of catching (attempting to catch) a goldfish by an operation, for example, of operating keys (such as the cross key 361j and the A-button 361a). However, an operation for catching a goldfish is not limited to such a key action or the like, and is optional. For example, in the case where the operation receiver 580 receives an operation by a player via the above-described touch panel 381, the operation for catching a goldfish may be performed by moving a touch pen or the like. Specifically, as shown in FIG. 13A, the operation for catching a goldfish may be performed by moving the poi PO by using a touch pen P or the like. Moreover, as shown in FIG. 13B, the operation for catching a goldfish may be performed by drawing a line DR by using the touch pen P or the like and thereby encircling a goldfish. In other words, the operation for catching a goldfish is optional, and can be changed appropriately depending on concrete hardware and the like.

In the above-described embodiment, description has been given of the case of performing, in the first device 400, the process of deleting an object selected (caught) by the second device 500. However, the process performed in the first device 400 is optional. For example, for an object with selection information received, the first device 400 can appropriately change, for example, a setting, a display, or a value (parameter), according to a progress of the game or the like.

In the above-described embodiment, description has been given by taking a goldfish scooping game as an example. However, the present disclosure is also applicable to various kinds of games in which a desired object is selected among a number of objects, as in a card game such as Karuta.

In the above-described embodiment, description has been given of the case of performing direct communication between the first device 400 and the second device 500. However, the communication may be performed via a predetermined communication network. For example, the first device 400 and the second device 500 may be configured to be connectable via the Internet, thereby performing communication from the first device 400 to the second device 500 as well as from the second device 500 to the first device 400 via the Internet. In this case, even when the total number of devices in direct communication between the first device 400 and the second devices 500 is limited, or the like, performing communication via the Internet can ease such a limitation.

SUMMARY OF INVENTION

The aspects of the intention described below represent examples of the present invention.

A game system according to a first aspect of the present disclosure is a game system in which a first device and a second device are communicable, the first device being capable of displaying an image on a first screen, the second device being operated by a player and capable of displaying an image on a second screen. The first device is configured by including a display controller, a receiver, and an executor, and the second device is configured by including a detector, a display controller, and a transmitter.

First, in the first device, the display controller generates an image including a plurality of objects arranged in virtual space and displays the generated image on the first screen (for example, a large screen remote from a player). Moreover, the receiver receives selection information (for example, catch information or the like), of any of the objects, transmitted from the second device. Then, the executor executes a process (for example, a process for deleting a caught object from the screen or the like) for the selected object based on the received selection information. Meanwhile, in the second device, the detector detects a target region in the first screen. For example, two light-emitting dots are provided near the first screen, and the detector analyzes positional relationship or the like of the two light-emitting dots included in a captured image, calculates a spatial position and a direction of the second device, and finally detects a target region in the first screen. Moreover, the display controller generates an image including an object displayed in the detected target region and displays the generated image on the second screen (for example, a small screen at hand of a player). Then, in response to a predetermined selection operation (for example, an operation for catching an object) performed on the object displayed on the second screen, the transmitter generates selection information of the object (for example, catch information or the like), and transmits the selection information to the first device.

In other words, a target region in the large remote screen is detected in the second device operated by a player, and an image including an object in the target region is displayed on the small screen at hand. This enables the player to perform the selection operation (a catch operation or the like) while checking the object in the target region on the small screen at hand. In addition, when the selection operation (a catch operation or the like) is performed on an object in the second device, selection information (catch information or the like) of the object is generated and is then transmitted to the first device. Then, based on the selection information, the first device carries out a process (a process of deleting a caught object or the like) for the selected object. Thus, the player can easily perform the selection operation on the object displayed on the remote screen on the screen at hand.

A game system according to a second aspect of the present disclosure is a game system in which a first device and a second device are communicable, the first device being capable of displaying an image on a first screen, the second device being operated by a player and including a second screen, which is smaller than the first screen. The first device is configured by including an object manager, a transmitter, a display controller, a receiver, and an executor, and the second device is configured by including a detector, a receiver, a display controller, and a transmitter.

First, in the first device, the object manager manages at least positional information of a plurality of objects movably arranged in virtual space. Moreover, the transmitter transmits the managed positional information to the second device. The display controller generates an image including an object in a predetermined range in the virtual space and displays the generated image on the first screen (for example, a large screen remote from a player). Furthermore, the receiver receives selection information (for example, catch information or the like), of the object, transmitted from the second device. Then, the executor executes a process (for example, a process of deleting a caught object or the like) for the selected object based on the received selection information. Meanwhile, in the second device, the detector detects a target region that is smaller than a range being aimed in the first screen by the second device. For example, two light-emitting dots are provided near the first screen, and the detector analyzes positional relationship or the like of the two light-emitting dots included in a captured image, calculates a spatial position and a direction of the second device, and finally detects a target region in the first screen. Moreover, the receiver receives positional information transmitted from the first device. The display controller generates an image including an object, in the detected target region, corresponding to the received positional information, and displays the generated image on the second screen (for example, a small screen at hand of a player). Then, in response to a predetermined operation (for example, an operation for catching an object) performed on the object displayed on the second screen, the transmitter generates selection information of the object (for example, catch information or the like) and transmits the selection information to the first device.

In other words, a target region in the large remote screen is detected in the second device operated by a player, and an image including the object in the target region is displayed on the small screen at hand. This enables the player to perform the selection operation (a catch operation or the like) while checking the object in the target region on the small screen at hand. In addition, when the selection information (catch information or the like) is performed on an object in the second device, selection information (catch information or the like) of the object is generated and is then transmitted to the first device. Then, based on the selection information, the first device carries out a process (a process of deleting a caught object or the like) for the selected object. Thus, the player can easily perform the selection operation on the object displayed on the remote screen on the screen at hand.

The detector may detect a target region in the first screen based on an image captured by the second device. For example, two light-emitting dots may be provided near the first screen, and the detector may analyze positional relationship or the like of the two light-emitting dots included in a captured image, calculate a spatial position and a direction of the second device, and finally detect a target region in the first screen. Alternatively, different marker images (two-dimensional codes or the like, as an example) may be displayed at fixed positions distributed appropriately in the first screen, and the detector may detect a target region by recognizing marker images included in a captured image. Alternatively, a plurality of cards each including a marker image or the like printed thereon (AR cards or the like) may be arranged around the first screen appropriately, and the detector may detect a target region based on positional relationship of the marker images or the like included in a captured image.

A selection method according to a third aspect of the present disclosure is a selection method for a game system in which a first device and a second device are communicable, the first device being capable of displaying an image on a first screen, the second device being operated by a player and capable of displaying an image on a second screen. The selection method is configured by including an image control step, a detection step, a display control step, a transmission step, a reception step, and an execution step.

First, in the image control step of the first device, an image including a plurality of objects arranged in virtual space is generated and then displayed on the first screen (for example, a large screen remote from a player). Meanwhile, in the detection step of the second device, a target region in the first screen is detected. For example, two light-emitting dots are provided near the first screen, and in the detection step, positional relationship or the like of the two light-emitting dots included in a captured image is analyzed, a spatial position and a direction of the second device are calculated, and finally a target region in the first screen is detected. Moreover, in the display control step of the second device, an image including an object displayed in the detected target region is generated and then displayed on the second screen (for example, a small screen at hand of a player). Then, in the transmission step of the second device, in response to a predetermined selection operation performed on the object displayed on the second screen, selection information (for example, catch information or the like) of the object is generated and then transmitted to the first device. Moreover, in the reception step of the first device, selection information (for example, catch information or the like), of any of the objects, transmitted by the second device is received. Then, in the execution step of the first device, a process (for example, a process for deleting a caught object or the like) for the selected object is executed based on the received selection information.

In other words, a target region in the large remote screen is detected in the second device operated by a player, and an image including the object in the target region is displayed on the small screen at hand. This enables the player to perform the selection operation (a catch operation or the like) while checking the object in the target region on the small screen at hand. In addition, when the selection information (catch information or the like) is performed on an object in the second device, selection information (catch information or the like) of the object is generated and then transmitted to the first device. Then, based on the selection information, the first device carries out a process (a process of deleting a caught object or the like) for the selected object. Thus, the player can easily perform the selection operation on the object displayed on the remote screen on the screen at hand.

A non-transitory information recording medium according to a fourth aspect of the present disclosure stores a program for causing a computer (including electronic equipment) to function as the above-described game device.

The program can be recorded in a computer-readable non-transitory information recording medium such as a compact disc, a flexible disk, a hard disk, a magneto-optical disk, a digital video disc, a magnetic tape, and a semiconductor memory.

REFERENCE SIGNS LIST

Game system, 20 . . . Master unit, 30 . . . Subsidiary unit, 200 . . . Stationary, game console, 201 . . . CPU, 202 . . . ROM, 203 . . . RAM, 204 . . . Interface, 205 . . . External memory, 206 . . . DVD-ROM drive, 207 . . . Image processor, 208 . . . Audio processor, 209 . . . NIC, 210 . . . Light-emitting module, 220 . . . Display, 300 . . . Portable game console, 310 . . . Process controller, 311 . . . CPU core, 312 . . . Image processor, 313 . . . DMA controller, 314 . . . VRAM, 315 . . . WRAM, 316 . . . LCD controller, 317 . . . Touch panel controller, 321 . . . Connector, 330 . . . Cartridge, 331 . . . ROM, 332 . . . RAM, 341 . . . Wireless communicator, 342 . . . Communication controller, 351 . . . Sound amplifier, 352 . . . Speaker, 361 . . . Operation key, 371 . . . First display, 372 . . . Second display, 381 . . . Touch panel, 391 . . . Outer camera, 392 . . . Inner camera, 400 . . . First device, 410 . . . Image information storage, 420 . . . Object manager, 430 . . . Game controller, 440 . . . Communicator, 450 . . . Image generator, 460 . . . Image display, 500 . . . Second device, 510 . . . Image information storage, 520 . . . Positional information storage, 530 . . . Communicator, 540 . . . Target region detector, 550 . . . Controller, 560 . . . Image generator, 570 . . . Image display, 580 . . . Operation receiver

The invention claimed is:

1. A game system, comprising:
 a first device configured to display an image on a first display; and
 a second device configured to display an image on a second display and operated by a player, wherein the first device and the second device communicate with each other,
 the first device comprising:
  a display controller configured to generate an image including a plurality of objects arranged in virtual space and display the image on the first display;
  a receiver configured to receive selection information of any of objects transmitted from the second device; and
  an executor configured to execute a process for a selected object based on the received selection information, and
 the second device comprising:
  a detector configured to detect a target region in the first display;
  a display controller configured to generate an image including an object displayed in the detected target region and display the image on the second display; and
  a transmitter configured to generate selection information of an object displayed on the second display in response to a predetermined selection operation on the object and transmit the selection information to the first device.

2. A game system, comprising:
 a first device configured to display an image on a first display; and
 a second device including a second display smaller than the first display and operated by a player, wherein the first device and the second device communicate with each other,
 the first device comprising:
  an object manager configured to manage at least positional information of a plurality of objects movably arranged in virtual space;
  a transmitter configured to transmit the managed positional information to the second device;
  a display controller configured to generate an image including an object in a predetermined range in the virtual space and display the image on the first display;
  a receiver configured to receive selection information of an object transmitted from the second device; and
  an executor configured to execute a process for a selected object based on the received selection information, and
 the second device comprising:
  a detector configured to detect a target region of a range smaller than a range of the first display aimed at by the second device;
  a receiver configured to receive positional information transmitted from the first device;
  a display controller configured to generate an image including an object of received positional information in the detected target region and display the image on the second display; and a transmitter configured to generate selection information of an object displayed on the second display in response to a predetermined operation on the object and transmit the selection information to the first device.

3. The game system according to claim 2, wherein the detector detects a target region in the first display based on an image captured by the second device.

4. A selection method for a game system comprising a first device configured to display an image on a first display and a second device configured to display an image on a second display and operated by a player, wherein the first device and the second device communicate with each other, the first device comprising a display controller, a receiver, and an executor, and the second device comprising a detector, a display controller, and a transmitter, the selection method comprising:

generating, via the display controller of the first device, an image including a plurality of objects arranged in virtual space and displaying, via the display controller of the first device, the image on the first display;

detecting, via the detector of the second device, a target region in the first display;

generating, via the display controller of the second device, an image including an object displayed in the detected target region and displaying, via the display controller of the second device, the image on the second display;

generating, via the transmitter of the second device, selection information of an object displayed on the second display in response to a predetermined selection operation on the object and transmitting, via the transmitter of the second device, the selection information to the first device;

receiving, via the receiver of the first device, selection information of any of objects transmitted from the second device; and executing, via the executor of the first device, a process for a selected object based on the received selection information.

5. A non-transitory information recording medium storing a program for a first computer and a second computer, the first computer configured to display an image on a first display and the second computer configured to display an image on a second display and operated by a player, wherein the first device and the second device communicate with each other, the program causing the first computer to function as:

a display controller configured to generate an image including a plurality of objects arranged in virtual space and display the image on the first display;

a receiver configured to receive selection information of any of objects transmitted from the second computer; and an executor configured to execute a process for a selected object based on the received selection information, and the program causing the second computer to function as:

a detector configured to detect a target region in the first display;

a display controller configured to generate an image including an object displayed in the detected target region and display the image on the second display; and a transmitter configured to generate selection information of an object displayed on the second display in response to a predetermined selection operation on the object and transmit the selection information to the first computer.

\* \* \* \* \*